UNITED STATES PATENT OFFICE.

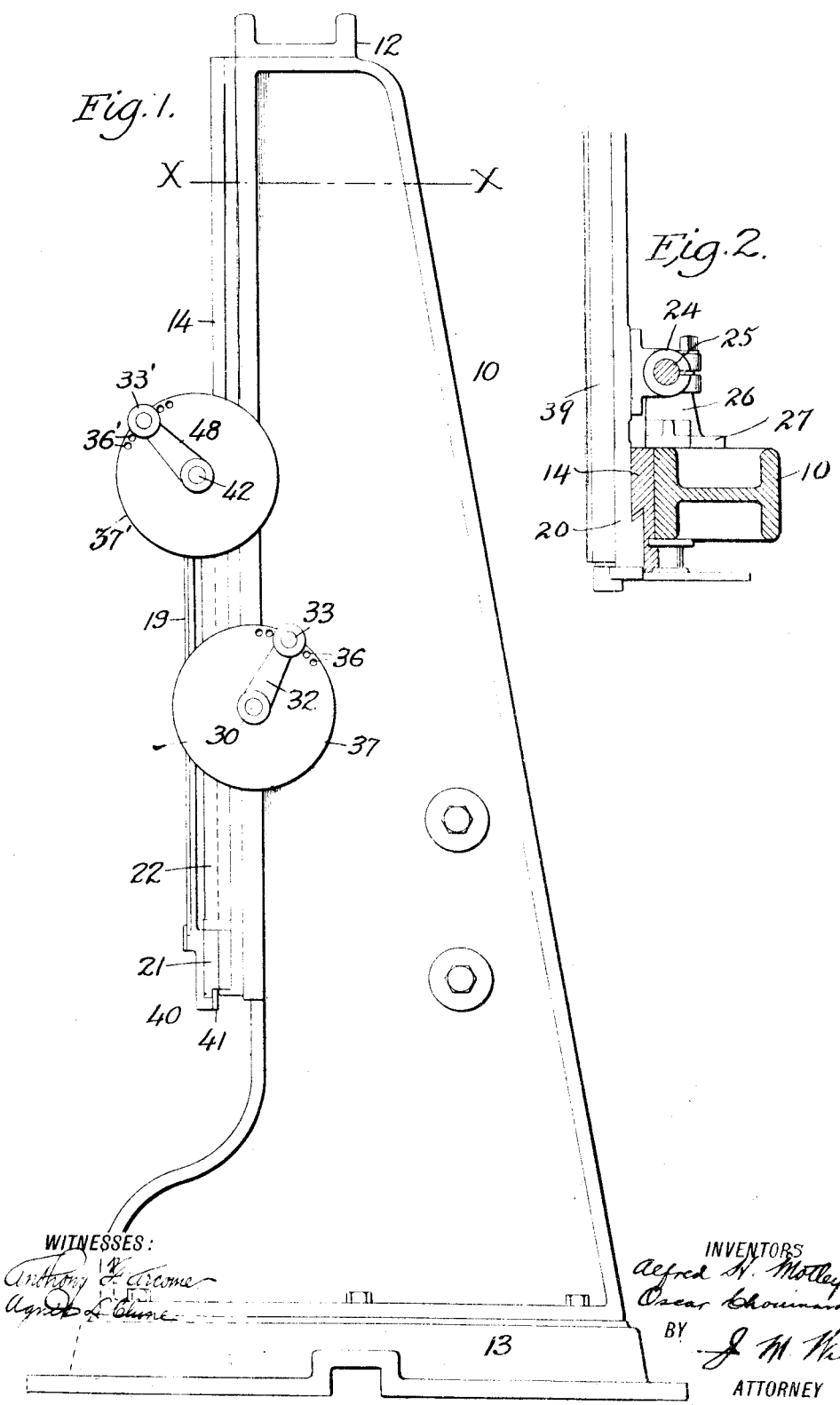

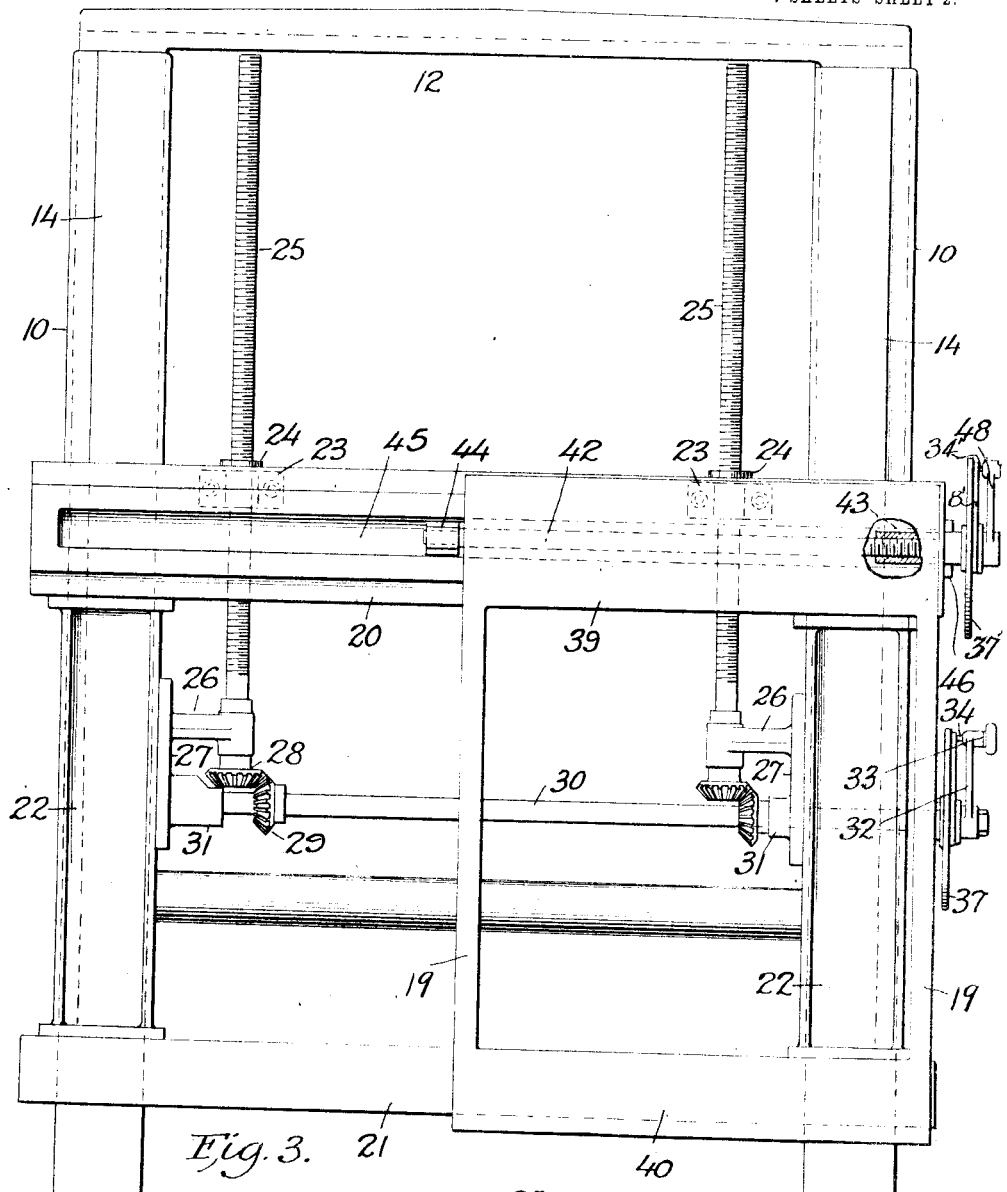

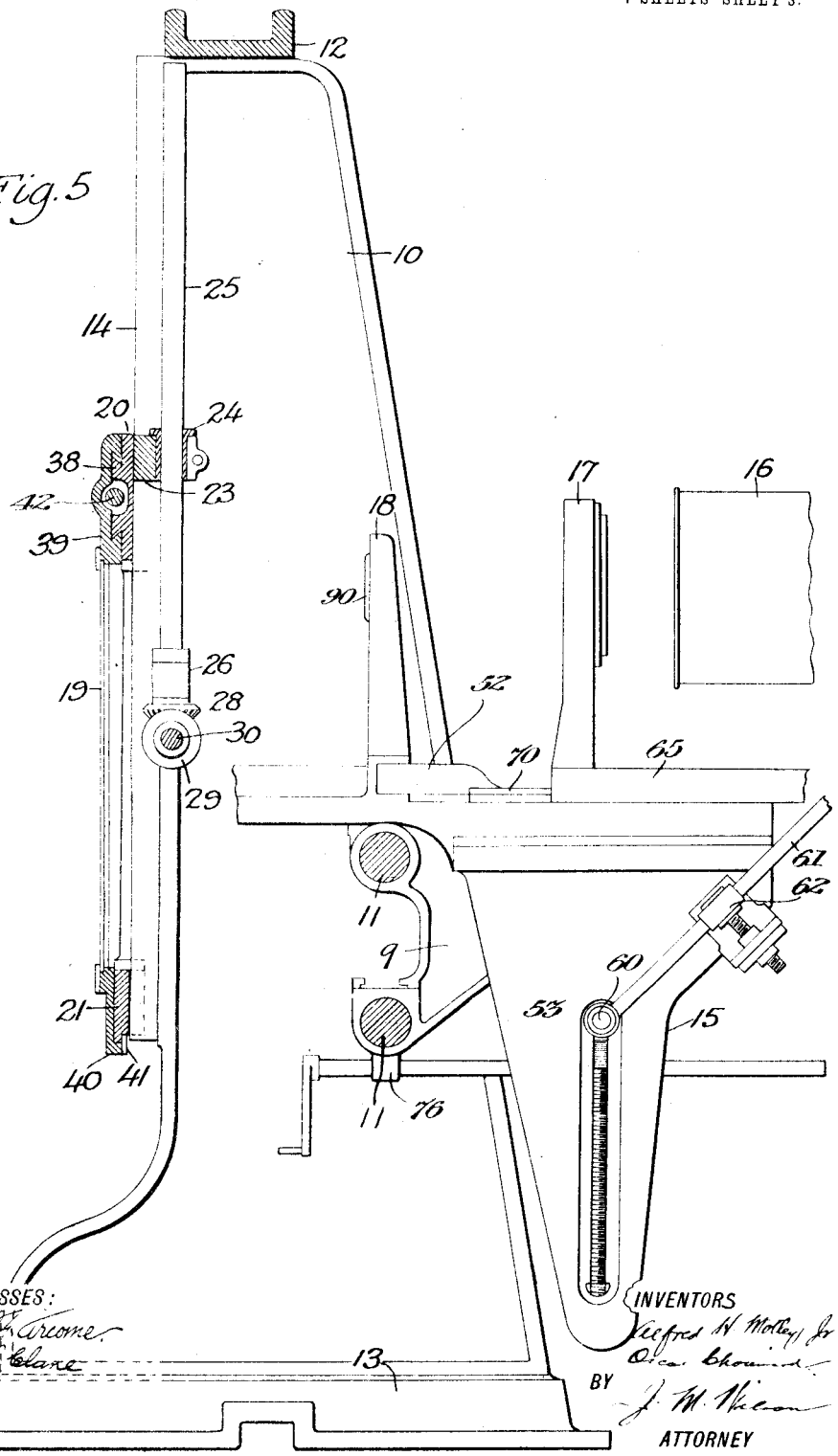

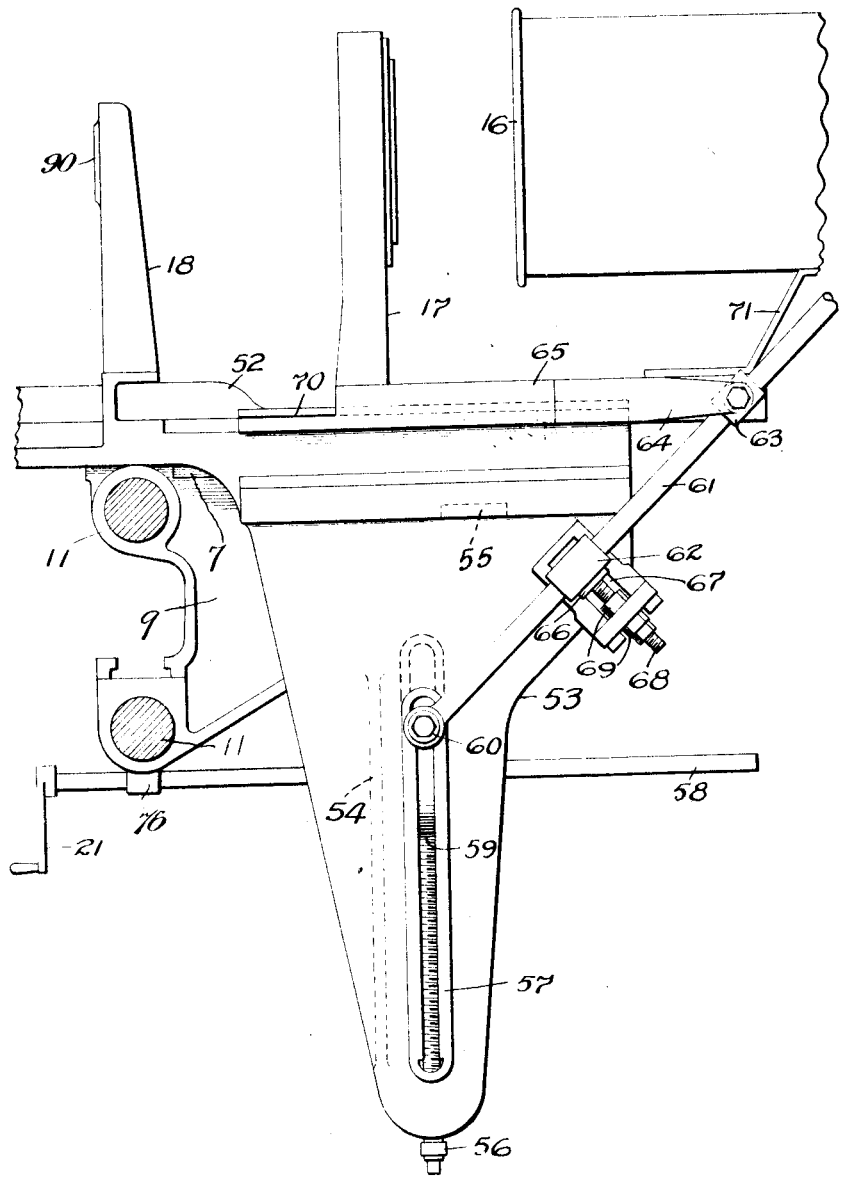

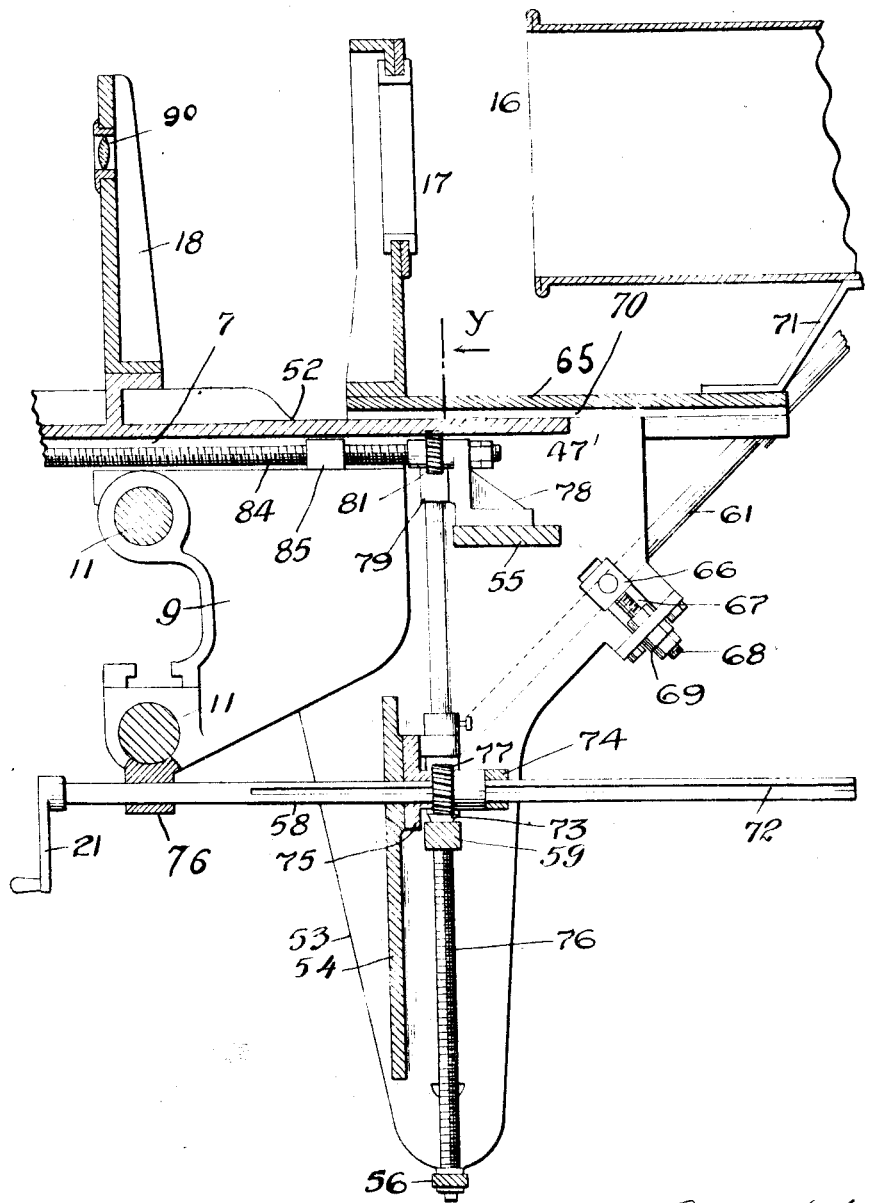

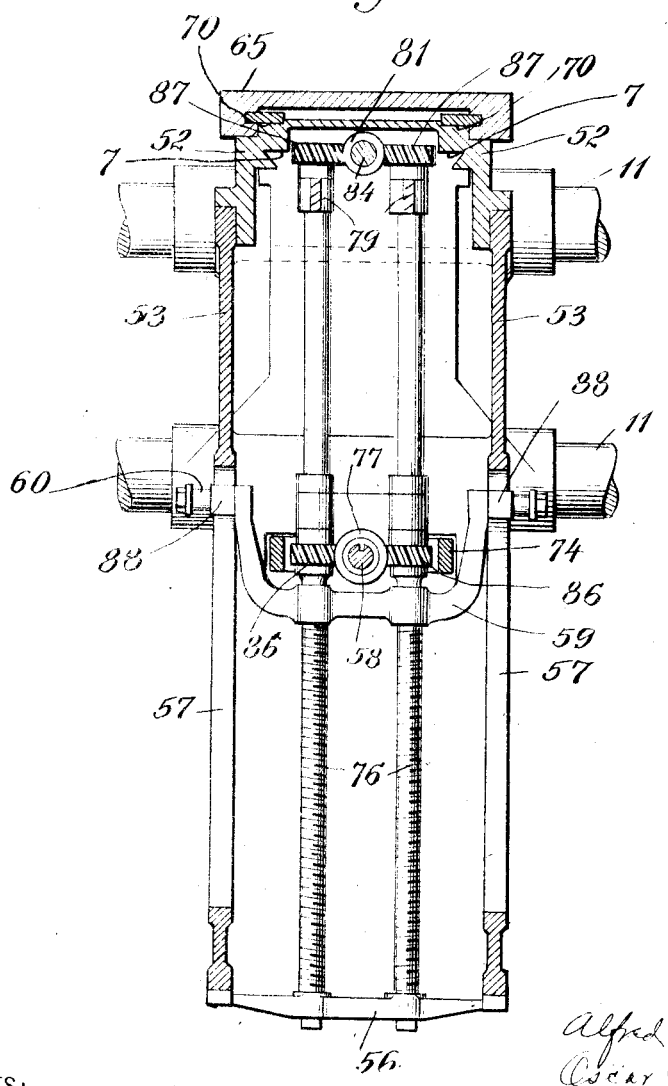

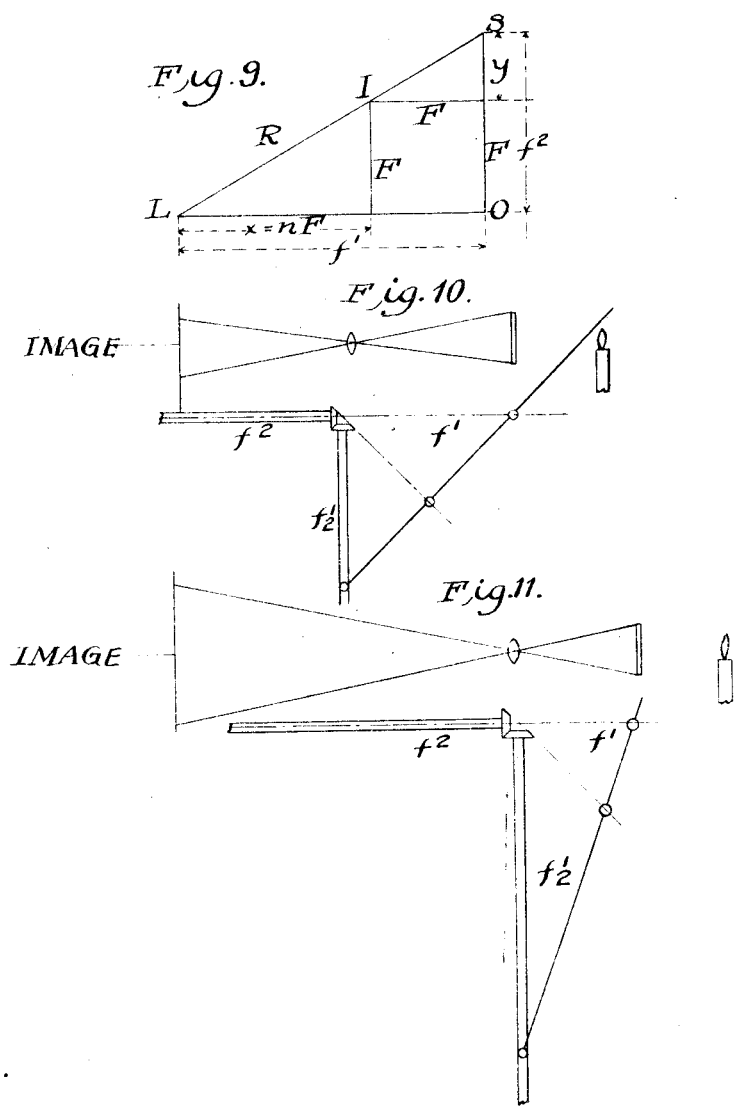

ALFRED H. MOTLEY, JR., AND OSCAR CHOUINARD, OF NEW YORK, N. Y., ASSIGNORS, BY MESNE ASSIGNMENTS, TO LITHOTEX CORPORATION, OF NEW YORK, N. Y., A CORPORATION OF NEW YORK.

STEP AND REPEAT MACHINE.

1,131,630.  Specification of Letters Patent.  Patented Mar. 9, 1915.

Application filed August 16, 1909. Serial No. 513,164.

*To all whom it may concern:*

Be it known that we, ALFRED H. MOTLEY, Jr., a citizen of the United States, and a resident of the borough of Manhattan, in the city, county, and State of New York, and OSCAR CHOUINARD, a subject of the King of England, and a resident of the borough of Brooklyn, city of New York, county of Kings, and State of New York, have invented certain new and useful Improvements in Step and Repeat Machines, of which the following is a specification.

Our invention relates to step and repeat machines for photographically reproducing a design upon a sensitized surface, and the invention relates more particularly to a step and repeat machine by means of which a design may be photographically reproduced a number of times upon different portions of a sensitized surface or plate either in the same or in an enlarged size by successively projecting the image of the design through a suitable lens upon successive portions of the plate, and in which the plate and design are so arranged as to always be maintained in the conjugate foci of the lens while the size of the image is varied, and in which relative movement is produced between the sensitized plate on the one hand and the lens and unit design on the other transverse to the line of projection, without disturbing the previous adjustment of the parts along said line.

Our invention consists in providing an accurate and durable machine of the above type, arranged and constructed to operate easily, smoothly and rapidly; and it further consists in providing such a machine with an indicating dial or counting head, by means of which the positioning of the successive images on the plate may be accomplished with great precision.

Where it is sought to use a step and repeat machine in building up a design from a unit, the successive positioning of the images of the unit design upon the sensitized plate is an exceedingly delicate operation, as in some cases the numerous and delicate lines of the intricate configuration of an image must exactly meet and join the corresponding lines of similar adjacent images; and where it is desired to produce plates for delicate and accurate multiple color printing, a plate for each color each having a number of reproductions of a component part of the complete colored design, accurate registration of the corresponding reproductions on the different plates must be secured in order that the different plates bearing the reproductions of the component parts of the complete design in different colors will always register to produce accurate and perfect color effects. Again, in building up designs on a step and repeat machine from a unit design, or in reproducing a small print or design or two or more different prints or designs a great number of times on a large plate, it is very desirable, from the standpoint of economy in plate surface and more especially in printing from the plate, that the image of the design or the images of the two or more different designs, as the case may be, should be focused on the plate for stepping and repeating in a size or in sizes which will be an even factor of the area of the plate, so that as much of the plate surface as possible will be utilized. In such cases, the designs on the plate, after being developed, may be photographically enlarged or reduced to the required size, and the printing surface made up from this plate. In such work, the size of the image must, obviously, be very accurately determined, since any error would be cumulative, and, in order to obtain the desired size of image in perfect focus with any degree of despatch, it is essential that the machine be such as will maintain the focus while the size of the image is being adjusted on the plate. Heretofore it has been impossible to accomplish the finer grades of work of the above character with any step and repeat machine known to us. We have found that, to successively accomplish this exceedingly accurate work, it is important that the movable parts of the machine should be operated smoothly without great effort on the part of the operator, and without jar or vibration of the parts, so that there will be no strain or shock on the adjustable parts or the operating mechanism or any tendency to distort or loosen the same, any of which troubles would prevent quick and accurate work and in time cause lost motion between the different parts. Since, in performing this delicate and accurate work, the distance through which the plate is to be moved for each projection of the image thereon must be accurately measured or determined, we have found that it is also important to provide suitable indicating mechanism by means of which the positioning of the successive images of the design on the sensitized surface may be accomplished with great accuracy and precision.

The object of our invention is to provide a stop and repeat machine of the above type which will operate with such precision and accuracy that it can be used for readily accomplishing such work as above described.

To this end, we provide a machine in which the sensitized plate and the object are always maintained in the conjugate foci of the lens, and in which the sensitized plate is repeatedly stepped horizontally and vertically transverse to the line of projection through the unit design and lens, without disturbing the previous adjustment of the three elements along the line of projection; and we also provide a dial having a movable marker or indicator adjacent to a rotating handle which is operated for shifting the plate, by means of which the distance of the successive movements of the plate may be indicated with great precision.

In the preferred form of our invention, as herein shown, we move the lens and unit design along the line of projection relative to the plate, and we mount the plate holder to slide back and forth horizontally on a guideway formed on a supporting carriage which, in turn, travels vertically on guideways mounted on the main frame, and we provide screws for operating the holder and carriage.

In machines made in accordance with our invention, an image of the design in an exact predetermined size may be quickly projected on the screen in perfect focus, and the mechanism may be operated with little effort or skill by a single operator, so that successive images of the design can be rapidly and easily projected upon the plate and made to register with great accuracy.

The sensitized surface upon which the design is reproduced may be that of a zinc plate or stone which, by subsequent development and etching, may be transformed directly into a printing surface, or the surface may be that of a transparent plate which may be developed, and from which a design may be photographed in a reduced or enlarged size upon a suitable surface which may be etched and then inked and transferred onto a roller which, after being etched, may be used in all kinds of continuous web printing upon textile fabrics, wall paper, etc.

Our invention will be more readily understood and the objects and advantages thereof will more fully appear from the following description taken in connection with the accompanying drawings, in which—

Figure 1 is a side elevation of the main frame of a machine embodying the invention; Fig. 2 is a cross-sectional view of one end taken on line $x$—$x$ and showing the end of the vertical plate carriage in its guideway; Fig. 3 is a front view of the machine with the focusing apparatus removed; Fig. 4 is a detailed view of a crank arm; Fig. 5 is a side elevation of the assembled machine, partially in section; Fig. 6 is a side view of the rear part of the machine; Fig. 7 is a longitudinal sectional view of the rear part of the machine; Fig. 8 is a cross-sectional view taken on line $y$—$y$ of Fig. 7, omitting the holders; Fig. 9 is a diagrammatical illustration of the relation to the lens of the image and object distances; Figs. 10 and 11 are diagrammatical side elevations of the mechanism.

Referring to the drawings, Figs. 1, 3 and 5, the main supporting frame consists of uprights or side pieces 10 bolted to a base 13 and connected at their upper ends by a yoke or cross piece 12 and also connected intermediate their ends by two horizontal rods 11 on which is mounted a bracket 9 which supports the projecting apparatus hereinafter mentioned.

On the front faces of the uprights 10 are mounted smooth vertical guideways 14 on which moves a vertically sliding carriage consisting of upper and lower horizontal bars 20 and 21 which extend across the front of the machine and are connected by vertical end pieces 22. The upper horizontal bar 20 has a tongue or guideway 38 formed on its front face with a groove 45 formed therein, and along this guideway moves a horizontally sliding plate holder comprising upper and lower horizontal bars 39 and 40 with vertical connecting pieces 19. A channel in the upper bar 39 engages with the tongue 38 on the bar 20, and the holder is steadied at its lower end by means of a flange 41 secured to the lower horizontal bar 40 which engages a rabbeted edge of the horizontal bar 21 (Fig. 5) on which it slides. This horizontally sliding holder is adapted to receive the sensitized plate on which the design or pattern is to be reproduced.

Horizontal movement of the holder is effected by means of a handle 48 mounted on a threaded shaft 42 which extends along the groove 45 between the adjacent surfaces of the bars 20 and 39. The shaft 42 passes through a threaded nut 43 (Fig. 33) secured to the rear of bar 39 and projecting within the groove 45, the shaft being journaled at its inner end in a bracket 44 formed in the groove 45 of bar 20, and at its outer end in a hub or sleeve 46, also secured to cross bar 20. By this means as the handle 48 is rotated, the horizontally moving holder is caused to move back and forth along the bars 20—21, depending upon the direction of rotation of the handle. In the particular embodiment of the invention shown, the threaded shaft has ten threads to the inch, so that one revolution of the handle 48 moves the holder horizontally a distance of one-tenth of an inch.

It will be seen from the above described construction of the apparatus that the plate-holding frame (as shown in Fig. 5) is slidingly suspended at its upper end from the tongue or guideway, 38, so that it may bear at its lower end against the guide bar 21 in engagement with which it is preferably held from lateral displacement by the flange 41 as above described. It will also be observed that the screw 42 which drives the plate-holding frame horizontally along its horizontal supporting guide, engages the frame along a line in proximity to the line of suspension of the frame. This construction insures a very smooth and easy operation of the carriage, and effectively prevents any vibration or tendency to jam which would result from any canting of the carriage on its support.

Vertical movement of the sensitized plate is effected by means of two vertical threaded shafts or screws 25 journaled in brackets 26 secured to the uprights 10, the shafts passing through threaded nuts 24 (Fig. 3) secured to the rear of the horizontal cross bar 20 of the vertically sliding carriage or frame. The lower ends of the vertical shafts 25 are provided with bevel gears 28 meshing with bevel gears 29 on a horizontal shaft 30 journaled in sleeves 31 formed on bases 27 which support the brackets of the vertical shafts, the bases 27 being secured to the uprights 10. This horizontal shaft 30 is rotated by means of a crank handle 32, the threads of the shafts 25 and the bevel gearing being such that one revolution of the handle 32 moves the carriage vertically a tenth of an inch.

Graduated dials or disks 37—37' are mounted respectively on the shafts 30 and 42 adjacent the respective handles 32 and 48, the disk 37' being secured to hub 46 in which the shaft 42 is journaled, and disk 37 being secured to the adjacent upright 10 of the main frame (Figs. 3 and 4). The disks are respectively provided with evenly spaced perforations 36—36' and with markers 8—8' mounted concentric therewith so that each marker can be set at any hole in its disk. The respective handles are provided with pins 34—34' (Fig. 4) mounted in knobs 33—33' and pressed toward the dials by springs 35, one for each of the pins, so that whenever the operator releases a knob, the spring forces the pin into the hole with which it is in register, thus locking the shaft against further movement.

The mechanism for supporting the lens and design comprises the bracket 9 which is mounted on the two horizontal rods 11 connecting the uprights 10 and on the upper surface of this bracket there is formed a slideway or track 7 (Figs. 6, 7 and 8) on which is mounted a sliding frame or carriage 52 carrying a lens 60 mounted in a lens holder 48. This carriage 52 is provided on its upper surface with a track or guideway 70 on which is slidingly mounted a second frame or slide 65 carrying an object holder 17 in which is placed the design to be projected. The rear end of this slide 65 is also provided with a vertical bracket 71 which supports a box or cylinder 16 for receiving a suitable light. The first sliding frame or carriage 52 has two depending side pieces 53 connected at their lower extremities by a yoke 56 and also connected intermediate their ends by a horizontal web or cross piece 55 and by a vertical web 54.

The mechanism for adjusting the slides along the line of projection is supported between these depending side pieces and consists of a shaft 58 supported at the front end in a sleeve 76 secured at the lower point of bracket 9, the shaft also being journaled in a yoke 74 mounted on a bracket 75 (Figs. 7 and 8) which in turn is secured to the vertical web 54 connecting the depending side pieces 53. The shaft 58 is provided with a crank handle 21 at its front end and is also provided with a gear 77 having a feather engaging a longitudinal groove 72 formed in the shaft. This gear in turn meshes with pinions 86 mounted on vertical shafts 76 (Fig. 8). The lower ends of the vertical shafts are steadied in the yoke 56 and their upper ends are journaled in bearings 79 extending from a bracket 78 secured to the horizontal web or cross piece 55, connecting the side members 53. Each shaft carries at its upper end a pinion 87 which meshes with a gear 81 keyed on a horizontal screw 84 which is journaled at its rear end in the bracket 78, and held from longitudinal movement therewith by lock means 47' so as to insure meshing of the gear 81 with the pinions 87.

The threads of the spindle 84 engage with a nut 85 rigidly secured to the main supporting bracket 9 so that through the medium of the above described mechanism the sliding frame 52 is moved back and forth when the shaft 58 is rotated by handle 21.

The parts of the vertical shaft 76 extending below the bracket 75 (Fig. 7) are provided with threads corresponding to the threads on the screw 84. A yoke 59 (Fig. 8) is provided, having threaded nuts engaging with the threads on the vertical shaft 76, so that when handle 21 is rotated the yoke is raised or lowered simultaneously with the horizontal movement of frame 52, and at the same rate as the frame is moved. The yoke 59 carries at its outer extremities slide blocks 88 which are adapted to slide up and down in guideways 57 formed in the side pieces 53, and at the outside of each slide block there is a pivot pin 60 on which there is pivotally mounted a slide rod 61 (Fig. 6). These sliding rods 61 pass through swiveled guideways or sleeves 62 swiveled on slide blocks 66, and are connected at their upper ends to pivoted guides 63 secured to brackets 64 at the rear end of the slide 65. The slide blocks 66 on which are mounted the swiveled guides or sleeves 62 just mentioned are adjustably mounted in slots 67 and are moved by means of nuts 69 threaded on screws 68.

The slide blocks 66 do not slide in the slots during the operation of the machine, but said adjustment is for the purpose of primarily establishing the proper relation between the lens carrying slide 52 and the slide 65 carrying the design, thereby securing the necessary sharpness of the image of the design projected on the sensitized plate. When this adjustment is once made for any particular lens, the slide blocks 66 remain fixed in position and the rods 61 slide through the guideways or sleeves 62 which are pivoted on said guide blocks. This pivot or fulcrum point for a given lens will be at the intersection of two lines, one parallel to the line of movement of the connection of the sliding rod to the slide 65 and the focal distance of the lens from said line, the other line being parallel to the line of movement of the point of connection of said rod to the threaded shaft, or in this case, parallel to the slot 57 along which the other end of the rod slides, and at the focal distance of the lens from said line or slot. The slot 67 along which the fulcrum point is adjusted for different lens should extend along a line passing through the point of intersection of these two lines. Such a line will bisect the angle formed between the slot 57 and the line of movement of the end of the rod connected to the sliding frame 65, and as shown, the slot 67 along which the fulcrum point is adjusted will be at an angle of 45 degrees to the vertical slot 57.

When the shaft 58 is rotated to give a downward movement to the yoke 59 the ends of the yoke draw down with them the sliding rods 61 which, as they move down, change their angle of inclination; and the upper ends being thrown forward, move the slide 65 forward toward the sensitized plate.

The gearing mechanism is so proportioned that while the slides 52 and 65 are simultaneously moved by rotating the handle 21, their respective rates of movement are such as to decrease or increase the distance of the object or design holder from the lens so as to vary the size of the image of the design on the sensitized plate while at all times maintaining the sensitized plate and the object or design holder in the conjugate foci of the lens. This is shown diagrammatically in Figs. 10 and 11. In Fig. 10, the lens is shown equidistant between the object or unit design and the image, so that the size of the image is equal to that of the design. In Fig. 11, the changed positions of the design and the lens produce an image three times the linear dimensions of the design. Fig. 9 illustrates the principle involved in the focusing movement; and in this figure, the sides F of the square are equal to the focus of the lens used.

Extending two sides OL and OS until they intersect any line R swung through the intersection I of the two opposite sides of the square F, the lengths $$LO = f',$$

and $$OS = f^2,$$

will be to each other as $$F(n+1)$$

is to $$F(1+\tfrac{1}{n})$$

and are thus equal to the conjugate foci of the lens F for an object distance $f'$, and the image distance $f^2$. Let $$f^2 - F = Y$$

and $$f' - F = X$$

and $$X = nF$$

then $$X : F = F : Y$$

$$nF : F = F : Y$$

$$Y = \tfrac{F}{n} \text{ hence } f^2 = F + \tfrac{F}{n} = F(1+\tfrac{1}{n})$$

$$X = nF \text{ hence } f' = F + nF = F(1+n)$$

Q. E. D.

The diagram of Fig. 9 demonstrates the distances $f'$ and $f^2$ in directions at right angles to each other whereas in actual practice, they are mostly needed in a continued straight line.

Figs 10 and 11 show how by gearing a horizontal rod representing the length $f^2$, to a vertical rod $f'_2$ to which the same movement is imparted in a vertical plane, the length $f'$ is obtained in the horizontal continuation of $f^2$.

With such a machine as described, when it is desired to enlarge the image on the sensitized plate, handle 21 is rotated in the direction to move the lens slide 52 rearwardly on the bracket away from the sensitized plate and at the same time the sliding rods 61 will be drawn down through their sockets so as to move the object slide 65 forward upon the lens slide 52 in the direction of the sensitized plate; but since the lens slide is traveling faster away from the sensitized plate than the object slide is moving upon the lens slide, the result of these movements will be that both the lens and the object will be moved away from the sensitized plate to increase their distance therefrom, while the lens and the object will approach each other in such manner as to maintain the focus. Conversely, when it is desired to reduce the size of the enlarged image upon the sensitized plate, the handle 21 is rotated in the opposite direction to move the lens slide 52 toward the sensitized surface, the rods 61 at the same time moving the object slide 65 rearwardly upon the lens slide; but inasmuch as the lens slide will approach the sensitized surface more rapidly than the object slide will move rearwardly upon the lens slide, the result of the movements will be that both the lens and the object will be brought nearer to the sensitized plate while the distance between the lens and the object will be increased in such manner as to maintain the proper focus.

In the particular embodiment of the machine shown, the sliding rods 61 are so related to the vertical slot 57, and the lens and sliding frames 52 and 65 are so positioned with respect to the sensitized plate that the transformation of the design is approximately unity when the sliding rods 61 are in the position shown, namely, with their lower ends near the upper extremity of the slot 57.

The specific construction of the automatic focus-maintaining apparatus herein shown and described, forms no part of our invention.

The operation of the machine will be best understood from the following description, in which the building up of a continuous design from a unit is set forth.

A photographic reproduction of the unit design is placed in the object or design holder 17 and it is adjusted therein in any suitable position. When the unit design is in the proper position in its plane, a focusing screen is placed in the sensitized plate holder and the holder on the front of the frame is then moved in the manner described so as to bring the image in a suitable position on the screen, say in the extreme lower left-hand corner. The shaft 21 is then rotated to adjust the image of the unit design upon the focusing screen to the desired size, maintaining at all times a sharp focus of the image on the screen. When the image with its register marks is adjusted to the proper size the focusing screen is then replaced by the sensitized plate or surface, and a projection of the unit design is made upon this plate. Knowing the width of this image and knowing the distance that the plate holder will be moved by each revolution and fraction of a revolution of the operating handle 48, the marker 8 is then set in position and the pin 34 withdrawn and the handle rotated the required number of revolutions and fraction of a revolution necessary to move the plate horizontally the exact distance of the width of the unit design, whereupon the knob 33 is released and the pin 34 will be forced by spring 35 into the hole with which it is in register, and then a second image of the unit design is projected upon the sensitized plate, and this operation repeated until the full row of unit designs is completed, whereupon the handle 38 of shaft 30 will be similarly rotated to move the vertically sliding carriage to shift the sensitized plate vertically the height of a unit image and a projection of the unit design is again made and so on.

It will thus be seen that we have provided an efficient and durable machine requiring but one operator for focusing and stepping, and that the machine may be rapidly and smoothly operated to focus an image in the exact predetermined size and to produce very accurate registration in reproducing and in building up designs on a sensitized plate, which machine we have found in practice to be free from vibrations which tend to upset the delicate adjustment required in apparatus of this class.

While we have described the operation of the machine in forming a complete design built up of reproductions of a unit design, for which work the particular form of machine shown is especially adapted, it is obvious that our invention may be used for many purposes where it is desired to reproduce one or more designs photographically.

Having thus described our invention, what we claim as new and desire to secure by Letters Patent, is:

1. In a step and repeat machine for photographically reproducing designs, the combination of a lens, a holder for a sensitized plate, a holder for an object, said holders being located in the conjugate foci of the lens, means for simultaneously altering the relative positions of the lens and the holders with respect to each other along the line of projection to adjust the size of the image of the object while maintaining the focus, a supporting frame on which the plate holder is mounted in a plane transverse to the line of projection and in front of the lens, means for moving said plate holder in said plane horizontally and means for moving it vertically in said plane without disturbing the adjustment of the parts along the line of projection.

2. In a step and repeat machine for photographically reproducing designs, the combination of a lens, a holder for a sensitized plate, a holder for an object, said holders being located in the conjugate foci of the lens, means for simultaneously shifting the lens and object holder along the line of projection so as to adjust the size of the image of the object while maintaining the focus, a supporting frame on which the plate holder is mounted in a plane transverse to the line of projection and in front of the lens, means including screw gearing for moving said plate holder horizontally in said plane, means including screw gearing for moving said plate holder vertically in said plane, and dials equipped with markers, one operatively related to each of said screw gearing for determining the positioning of the images on the plate.

3. In a step and repeat machine for photographically reproducing designs, the combination of a lens, a holder for a sensitized plate, a holder for an object, said holders being located in the conjugate foci of the lens, means for simultaneously altering the relative positions of the lens and the holders with respect to each other along the line of projection so as to adjust the size of the image of the object while maintaining the holders respectively in said conjugate foci, a supporting frame on which the plate holder is mounted in a plane transverse to the line of projection and in front of the lens, means including a threaded shaft and a nut operating thereon and secured to the plate holder for moving said plate holder horizontally in said plane, a dial mounted concentric with the shaft, a marker also mounted concentric with the shaft and operatively related to the dial to indicate the desired movements of the shaft for shifting the plate, and a part mounted on the shaft to rotate therewith and movable over the dial to indicate the movements of the shaft.

4. In a step and repeat machine for photographically reproducing designs, the combination of a lens, a holder for a sensitized plate, a holder for an object, said holders being located in the conjugate foci of the lens, means for simultaneously shifting the lens and object holder along the line of projection to adjust the size of the image of the object while maintaining the focus, a supporting frame having two uprights, vertical guideways or tracks on the uprights, a vertically moving carriage slidingly mounted on said guideways and extending between the same, means including a vertical screw and a nut operating thereon, one mounted on the supporting frame and one on the carriage for moving the carriage on its guideways, a horizontal guideway or track on said carriage on which the plate holder is slidingly mounted, means including a horizontal screw mounted on the vertically moving carriage and a nut operating thereon and mounted on the plate holder for moving the plate holder along said horizontal guideway, operating handles, one actuating the rotatable member of the screw and nut for moving the carriage, and the other actuating the rotatable member of the screw and nut for moving the plate holder, and means operatively related to said rotatable members for determining respectively the vertical and horizontal movements of the plate holder.

5. In a step and repeat machine for photographically reproducing designs, the combination of a lens, a holder for a sensitized plate, a holder for an object, said holders being located in the conjugate foci of the lens, means for simultaneously shifting the lens and object holder along the line of projection to adjust the size of the image of the object while maintaining the focus, a supporting frame having two uprights, vertical guideways or tracks on the uprights, a vertically moving carriage slidingly mounted on said guideways and extending between the same, a pair of vertical threaded shafts rotatively mounted on the frame, a threaded nut on each shaft secured to the carriage, means including a horizontal shaft geared to the threaded shafts for rotating the same to move the carriage vertically, a horizontal guideway or track on said carriage on which the plate holder is slidingly mounted, and means including a horizontal threaded shaft for moving the plate holder along said horizontal guideway.

6. In a step and repeat machine for photographically reproducing designs, the combination of a lens, a holder for a sensitized plate, a holder for an object, said holders being located in the conjugate foci of the lens, means for simultaneously shifting the lens and object holder along the line of projection to adjust the size of the image of the object while maintaining the focus, a supporting frame having two uprights, vertical guideways or tracks on the uprights, a vertically moving carriage slidingly mounted on said guideways and extending between the same, said carriage comprising upper and lower cross pieces connected by vertical end pieces, means including a pair of parallel vertical threaded shafts and a horizontal operating shaft geared thereto for moving the carriage on its guideways, a horizontal guideway or track on the upper and lower cross pieces of the carriage on which the plate holder is slidingly mounted, said plate holder having a cross piece parallel with and slidingly mounted upon the upper horizontal guideway, the adjacent surfaces of the upper cross piece of the carriage and plate holder having a groove formed therein, a threaded nut on one of said upper cross pieces, and means including a horizontal threaded shaft located in said groove and journaled on the other cross piece and engaging the threaded nut to move the plate holder horizontally along the carriage.

7. In a step and repeat machine for photographically reproducing designs, the combination of a lens, a holder for a sensitized plate, a holder for an object, said holders being located in the conjugate foci of the lens, means for simultaneously shifting the lens and object holder along the line of projection to adjust the size of the image of the object while maintaining the focus, a supporting frame having two uprights, vertical guideways or tracks on the uprights, a vertically moving carriage slidingly mounted on said guideways and extending between the same, a pair of vertical parallel screw threaded shafts each having a nut operating thereon for supporting the carriage and moving it on its vertical guideways, a horizontal shaft mounted on the supporting frame and geared to said threaded shafts to rotate the same to move the carriage vertically, a horizontal guideway or track on said carriage on which the plate holder is slidingly mounted, a horizontal threaded shaft and a nut operated thereon for moving the plate holder along the horizontal guideway, each of said horizontal shafts having mounted thereon a dial with a marker operatively related thereto, and an operating handle for each of said horizontal shafts, whereby the successive transverse movements of the plate may be accurately determined for positioning images of the design thereon.

8. In a step and repeat machine for photographically reproducing designs, the combination of a lens, a holder for a sensitized plate, a holder for an object, said holders being located in the conjugate foci of the lens, means for simultaneously shifting the lens and object holder along the line of projection to adjust the size of the image of the object while maintaining the focus, a supporting frame having a main base plate with two uprights, vertical guideways or tracks on the uprights, a vertically moving carriage slidingly mounted on said guideways and extending between the same, means for moving the carriage vertically on the guideways including a vertical screw and a nut operating thereon, one mounted on the carriage and the other on the supporting frame, and a horizontal rotatable operating shaft provided with an operating handle and also mounted on the supporting frame and geared to the screw gear member mounted on said frame, a horizontal guideway or track on said carriage upon which the plate holder is slidingly mounted, means for moving the plate holder on said guideway including a horizontal screw and a nut operating thereon, one mounted on the carriage and the other on the plate holder, and an operating handle for rotating the screw gear member mounted on the carriage.

9. In a step and repeat machine for photographically reproducing designs, the combination of a lens, a holder for a sensitized plate, a holder for an object, said holders being located in the conjugate foci of the lens, means for simultaneously shifting the lens and object holder along the line of projection to adjust the size of the image of the object while maintaining the focus, a supporting frame having two uprights, vertical guideways or tracks on the uprights, a vertically movable carriage slidingly mounted on the guideways and comprising upper and lower cross-pieces and connecting end pieces, the carriage being provided with means for slidingly engaging the vertical guideways to maintain the carriage in a vertical plane, means for driving the carriage vertically including a vertical screw and a nut operating thereon, one mounted on the supporting frame and the other on the carriage, a horizontal rotatable shaft also mounted on the supporting frame and geared to said driving means, and an operating handle for said shaft, a horizontal guideway extending along the upper cross-piece of said carriage, the plate holder being provided with means at its upper end for slidingly supporting it from said horizontal guideway, means for moving the plate holder along said guideway including a nut secured to the upper end of the plate holder with a screw mounted on said carriage and extending parallel with the horizontal guideway and engaging said nut, and a handle for operating the screw to move the carriage along said guideway.

10. In a step and repeat machine for photographically reproducing designs, the combination of a lens, a holder for a sensitized plate, a holder for an object, said holders being located in the conjugate foci of the lens, means for simultaneously shifting the lens and object holder along the line of projection to adjust the size of the image of the object while maintaining the focus, a supporting frame having two uprights, vertical guideways or tracks on the uprights, a vertically movable carriage slidingly mounted on the guideways and comprising upper and lower cross-pieces and connecting end pieces, means for moving the carriage vertically including gearing between the carriage and the supporting frame and a rotatable operating shaft connected with said gearing, a horizontal guideway extending along the upper part of said carriage from which the plate holder is slidably suspended so that it may bear at its lower end against the lower cross-piece of the carriage with which it slidingly engages, means for moving said plate holder along said horizontal guideway including a screw and a nut operating thereon, one mounted on the plate holder and the other on the carriage and extending along a line parallel with the horizontal guideway and in proximity thereto, and an operating handle connected with said screw gearing to move the plate holder along the guideway, whereby any tendency of the plate holder to bind on the guideway is prevented.

In witness whereof, we have hereunto set our hands this 2nd day of July, 1909.

ALFRED H. MOTLEY, Jr.
OSCAR CHOUINARD.

Witnesses:
AGNES L. CLUNE,
ANTHONY F. ARCOINE.